United States Patent Office 3,201,351
Patented Aug. 17, 1965

3,201,351
MINERAL OIL COMPOSITIONS
Joseph E. Fields and John H. Johnson, Dayton, Ohio, assignors to Monsanto Company, a corporation of Delaware
No Drawing. Filed June 12, 1961, Ser. No. 116,247
8 Claims. (Cl. 252—56)

The invention relates to mineral oil compositions having oil-soluble isobutylene/fumarate polymers therein.

Favorite heavy duty detergent additives presently used in motor oils for automobiles are additives containing large amounts of barium. It has been found that a number of commercially available viscosity index improvers and pour point depressants are not stable or compatible in the presence of these barium detergents which are basic in nature with the result that the engine oils containing mixtures of these additives steadily increase in viscosity and may eventually gel. A new type of viscosity index improver and/or pour point depressant which is an isobutylene/fumarate polymer has been discovered and very surprisingly this new additive is quite stable and compatible with the barium detergent additives in mineral oils.

It is an object of this invention to provide new and improved viscosity index improvers which are stable in mineral oils in the presence of barium or other basic detergent additives.

It is another object of this invention to provide new and improved pour point depressants which are stable in mineral oil in the presence of barium or other basic detergent additives.

It is another object of this invention to provide new and improved viscosity index improvers and pour point depressants which are stable in mineral oil in the presence of barium or other basic detergent additives.

These and other objects of the invention will become apparent as the detailed description of the invention proceeds.

The compositions of the invention have mineral oils as the major component, i.e. in excess of 50% by weight of the compositions, and minor amounts at least sufficient to increase the viscosity index substantially and/or to lower substantially the pour point of the base oil of oil-soluble polymers of isobutylene and alkyl fumarates. Other monomers in minor amounts can also be polymerized with the isobutylene and fumarates to form useful compositions. Also other oil additives can be present in the mineral oil, especially barium detergent additives, if desired. The isobutylene/fumarate polymers are present in the composition of the invention in concentrations ranging from about 0.05% to 5% or more, preferably from 0.1% to 0.5% when pour point depressing is the primary object, and a larger concentration for example, from 0.5% to 10% when viscosity index improvement is the primary object. It can be desirable to incorporate the isobutylene/fumarate polymers in mineral oils in substantially larger amounts up to 50% preferably from about 20 to about 40% by weight based on the mixture of the mineral oil and polymer, as a concentrate useful in blending back with mineral oil for actual use, e.g. as a motor oil for automobiles. For good viscosity index improving properties normally it will be preferred to use a polymer having an average molecular weight within the range of about 15,000 to about 100,000 preferably 20,000 to about 70,000; however, higher and lower molecular weight polymers will be operable. For pour point depressant uses it is preferred that the molecular weight of the polymer be below about 10,000, polymers having molecular weights of 2,000 to 3,000 being quite satisfactory, although 15,000 to 20,000 or higher molecular weight polymers will be effective as pour point depressants. The useful polymers of the invention must of course be soluble in the mineral oil in amounts and over the temperature range at which the mineral oil composition is to be used and normally preferred polymers will be soluble in mineral oil, e.g. an SAE-20 grade mineral lubricating oil to the extent of at least about 1% by weight at room temperature. To insure that the polymers will be soluble in mineral oil, the average number of carbon atoms in the alkyl groups of the fumarate should be at least about 6.5 preferably in excess of about 7.0. These polymers of fumarate and isobutylene are substantially 1:1 molar isobutylene to fumarates regardless of the ratio of the monomers charged in the process of producing the polymers, and normally a molar excess of isobutylene will be used in the process. For pour point depressant use a mixture of straight-chain alcohols ranging from about 8 to about 24 carbon atoms preferably from about 10 to 18 carbon atoms should be used to esterify fumaric acid making the fumarate monomers. For the purpose of this application lower alkyl is defined as 1 to 6 carbon atoms and higher alkyl as 8 to 24 carbon atoms.

An illustrative listing of suitable fumarates to choose from as comonomers with isobutylene is set forth below as follows: dimethyl fumarate, diethyl fumarate, methyl ethyl fumarate, diisopropyl fumarate, di-t-butyl fumarate, methyl n-butyl fumarate, di-n-butyl fumarate, di-isobutyl fumarate, di-n-amyl fumarate, di-n-hexyl fumarate, di-n-heptyl fumarate, di-n-octyl fumarate, di-2-ethylhexyl fumarate, diisooctyl fumarate, di-n-decyl fumarate, di-oxodecyl fumarate, butyl n-decyl fumarate, di-n-dodecyl fumarate, di-t-dodecyl fumarate, di-oxotridecyl fumarate, di-"Lorol" fumarate, di-tallow fumarate, di-n-eicosyl fumarate, etc. Tallow fumarates are obtained by esterifying fumaric acid with a mixture of about 67% by weight of $C_{16}$ and 33% by weight of $C_{18}$ straight-chain alkyl alcohol. Di-"Lorol" fumarates are obtained by esterifying fumaric acid with a mixture of 3%–$C_{10}$, 61%–$C_{12}$, 23%–$C_{14}$, 11%–$C_{16}$ and 2%–$C_{18}$ straight-chain alkyl alcohols.

An illustrative list of third types of monomers which can be polymerized with isobutylene and fumarates to form polymers which have special properties such as low temperature detergency or other properties in addition to high viscosity index and low pour point are the following: styrene, both higher and lower alkyl methacrylates such as methyl methacrylate, vinyl acetate, isopropenyl acetate, vinyloxyethanol, vinyl ethyl ether, β-hydroxyethyl butyl fumarate, β-hydroxyethyl "Adol 14" fumarate, dimethylaminoethyl butyl fumarate, diethylaminoethyl "Adol 14" fumarate, and the like.

The invention will be more clearly understood from the following detailed description of specific examples thereof.

EXAMPLE 1

This example describes the preparation of an isobutylene/dibutyl fumarate copolymer. Into a "Coke" bottle were placed 74 grams of water, 22.8 g. of dibutyl fumarate, 33.6 g. of isobutylene, 0.213 g. of potassium persulfate, and 1.14 g. of "Aerosol OT," a commercial wetting agent. The bottle was flushed with nitrogen, capped and placed in a rotating air oven at 70° C. for 24 hours. At the end of the 24 hour reaction period the emulsion of the reactants was broken by freezing and the product was water washed and dried. The polymer was repurified by dissolving in benzene and precipitating from methanol. Yield of purified polymer was 75.4% (21.4 g.). An elemental analysis of the purified product yielded the following results:

|  | Found | Theoretical |
|---|---|---|
| C, percent | 67.4 | 67.6 |
| H, percent | 10.1 |  |

A number of other experiments were carried out wherein isobutylene was copolymerized with various fumarates and mixtures of fumarates. The data from these experiments is summarized in Table I below.

Table 1

|  | Run No. 1 | Run No. 2 | Run No. 3 | Run No. 4 | Run No. 5 |
|---|---|---|---|---|---|
| Monomers | IB/BF | IB/2EHF | IB/oDF | IB/oDF | IB/EF/oDF. |
| IB/fumarate mole charge ratio | 6:1 | 6:1 | 6:1 | 6:1 | 4:1. |
| Product composition, mole ratio | 1:1 | 1:1 | 1:1 | 1:1 | 10:5:5. |
| Fumarates, average No. alkyl carbon atoms | 4.0 | 6.0 | 10.0 | 10.0 | 6.0. |
| Mole Percent Catalyst | $K_2S_2O_8$-AOT | $K_2S_2O_8$-AOT | $K_2S_2O_8$-AOT | 0.8% $Bz_2O_2$ | 0.8% $Bz_2O_2$. |
| Pressure, p.s.i.g |  |  |  | Autogenous | Autogenous. |
| Temperature, °C | 70 | 70 | 70 | 75 | 75. |
| Time, hours | 24 | 24 | 24 | 24 | 24. |
| Yield, percent | 75.4 | 71.7 | 82.5 | 93.3 | 87.5. |
| Percent polymer in conc. of Base Oil 1 |  | 25 | 30 | 30 | 30. |
| Oil visc. in Base Oil 2, 3% polymer—Kinematic visc., cs.: |  |  |  |  |  |
| At 100° F |  | 147.2 | 146.4 | 107.4 | 97.6. |
| At 210° F |  | 16.19 | 15.87 | 12.06 | 11.91. |
| Specific viscosities: |  |  |  |  |  |
| At 100° F |  | 0.608 | 0.599 | 0.173 | 0.066. |
| At 210° F |  | 0.569 | 0.538 | 0.168 | 0.154. |
| Efficiency |  | 0.936 | 0.898 | 0.971 | 2.333. |
| V.I. |  | 118.6 | 115.9 | 109.4 | 116.9. |
| Remarks | Emulsion polymer. | Emulsion polymer. | Emulsion polymer. | 20% hexane solvent. | 20% hexane solvent-haze. |

|  | Run No. 6 | Run No. 7 | Run No. 8 | Run No. 9 | Run No. 10 | Run No. 11 |
|---|---|---|---|---|---|---|
| Monomers | IB/EF/oDF | IB/EF/oDF | IB/EF/oDF | IB/EF/oDF | IB/EF/oDF | IB/EF/nDF. |
| IB/fumarate mole charge ratio | 12:1 | 12:1 | 12:1 | 12:1 | 12:1 | 12:1. |
| Product composition, mole ratio | 10:5:5 | 10:3:7 | 10:4:6 | 10:6:4 | 10:5:5 | 10:5:5. |
| Fumarates, average No. alkyl carbon atoms | 6.0 | 7.6 | 6.8 | 5.2 | 6.0 | 6.0. |
| Mole percent catalyst | 0.8% $Bz_2O_2$ | 0.8% $Bz_2O_2$ | 0.8% $Bz_2O_2$ | 0.8% $Bz_2O_2$ | 0.8% $Bz_2O_2$ | 0.8% $Bz_2O_2$. |
| Pressure, p.s.i.g | Autogenous | Autogenous | Autogenous | Autogenous | 3500-$H_2O$ | 4000-$H_2O$. |
| Temperature, °C | 82 | 70 | 70 | 70 | 70 | 70. |
| Time, hours | 24 | 24 | 24 | 24 | 18 | 18. |
| Yield, percent | 92.5 | 97.8 | 94.3 | 92.5 | 96.1c | 98.4c. |
| Percent polym. in conc. of Base Oil 1 | 30 | 40 | 40 | 40 | 30 | 40. |
| Oil visc. in Base Oil 2, 3% polymer—Kinematic Viscosity, cs.: |  |  |  |  |  |  |
| At 100° F | 98.5 | 133.14 | 125.17 | 13.96 | 96.78 | 111.15. |
| At 210° F | 12.06 | 14.68 | 14.08 | 4.18 | 13.73 | 13.40. |
| Specific viscosities: |  |  |  |  |  |  |
| At 100° F | 0.075 | 0.454 | 0.365 | 2.659 | 0.056 | 0.212. |
| At 210° F | 0.163 | 0.422 | 0.356 | 2.040 | 0.324 | 0.298. |
| Efficiency | 2.173 | 0.930 | 0.981 | 0.767 | 5.786 | 1.377. |
| V.I. | 117.6 | 114.9 | 115.3 | 216.5 | 132.5 | 119.6. |
| Remarks | Haze | Oil non-foaming. |  | 7.5% polymer in Base Oil 3. | Haze insol. oil non foaming. | Haze. |

|  | Run No. 12 | Run No. 13 | Run No. 14 | Run No. 15 | Run No. 16 | Run No. 17 |
|---|---|---|---|---|---|---|
| Monomers | IB/nDF | IB/EF/nDF | IB/EF/nDF | IB/nDF | IB/EF/nDF | IB/EF/nDF. |
| IB/fumarate mole charge ratio | 12:1 | 12:1 | 12:1 | 12:1 | 12:1 | 12:1. |
| Product composition, mole ratio | 1:1 | 10:4:6 | 10:5:5 | 1:1 | 10:4:6 | 10:5:5. |
| Fumarates, average No. alkyl carbon atoms | 10.0 | 6.8 | 6.0 | 10.0 | 6.8 | 6.0. |
| Mole percent catalyst | 0.8% $Bz_2O_2$ | 0.8% $Bz_2O_2$ | 0.8% $Bz_2O_2$ | 0.8% $DCBz_2O_2$ | 0.8% $DCBz_2O_2$ | 0.8% $DCBz_2O_2$. |
| Pressure, p.s.i.g | Autogenous | Autogenous | Autogenous | Autogenous | Autogenous | Autogenous. |
| Temp., °C | 70 | 70 | 70 | 50 | 50 | 50. |
| Time, hours | 24 | 24 | 24 | 40 | 40 | 40. |
| Yield, percent | 93.0 | 96.4 | 95.8 | 100 | 100 | 99.4. |
| Percent polymer in conc. of Base Oil 1 | 40 | 40 | 40 | 40 | 40 | 40. |
| Oil visc. in Base Oil 2, 3% polymer—Kinematic viscosities, cs.: |  |  |  |  |  |  |
| At 100° F | 125.76 | 116.94 | 111.56 | 138.14 | 131.20 | 110.76. |
| At 210° F | 13.99 | 13.23 | 13.28 | 15.31 | 14.89 | 14.50. |
| Specific viscosities: |  |  |  |  |  |  |
| At 100° F | 0.373 | 0.276 | 0.218 | 0.509 | 0.431 | 0.210. |
| At 210° F | 0.356 | 0.275 | 0.297 | 0.483 | 0.436 | 0.405. |
| Efficiency | 0.954 | 0.906 | 1.317 | 0.949 | 1.012 | 1.929. |
| V.I. | 114.2 | 113.7 | 118.3 | 116.6 | 117.7 | 127.7. |
| Remarks | Oil non-foaming. |  | Oil non-foaming-haze. | Oil non-foaming. |  | Insol. at room temp. |

Table I—Continued

| | Run No. 18 | Run No. 19 | Run No. 20 | Run No. 21 | Run No. 22 | Run No. 23 |
|---|---|---|---|---|---|---|
| Monomers | IB/EnDF | IB/A₁₄F | IB/EF/A₁₄F | IB/EF/A₁₄F | IB/EF/A₁₄F | IB/EA₁₄F |
| IB/fumarate mole charge ratio | 12:1 | 12:1 | 4:1 | 4:1 | 4:1 | 12:1 |
| Product composition, mole ratio | 1:1 | 1:1 | 10:5:5 | 10:5.5:4.5 | 10:6:4 | 1:1 |
| Fumarates, average No. alkyl carbon atoms | 6.0 | 13.0 | 7.5 | 6.95 | 6.4 | 7.5 |
| Mole percent catalyst | 0.8% $DCBz_2O_2$ | 0.8% $DCBz_2O_2$ | 0.2% $DCBz_2O_2$ | 0.4% $DCBz_2O_2$ | 0.4% $DCBz_2O_2$ | 0.8% $DCBz_2O_2$ |
| Pressure, p.s.i.g | Autogenous | Autogenous | 25,000-IB | Autogenous | Autogenous | Autogenous |
| Temperature, °C | 50 | 50 | 50 | 50 | 50 | 50 |
| Time, hours | 24 | 24 | 17 | 48 | 48 | 24 |
| Yield, percent | 100c | 100c | 93.6c | 100c | 100c | 100c |
| Percent polymer in conc. of Base Oil 1 | 40 | 40 | 40 | 40 | 40 | 40 |
| Oil visc. in Base Oil 2, 3% polymer— Kinematic viscosities, cs.: | | | | | | |
| At 100° F | 127.84 | 128.25 | 168.92 | 128.82 | 110.2 | 135.07 |
| At 210° F | 14.92 | 14.33 | 19.91 | 14.92 | 14.54 | 15.21 |
| Specific viscosities: | | | | | | |
| At 100° F | 0.394 | 0.401 | 0.845 | 0.407 | 0.202 | 0.475 |
| At 210° F | 0.438 | 0.389 | 0.929 | 0.446 | 0.402 | 0.474 |
| Efficiency | 1.112 | 0.970 | 1.099 | 1.096 | 1.990 | 0.998 |
| V.I. | 119.9 | 115.3 | 126.4 | 119.3 | | 117.6 |
| Remarks | Oil non-foaming | Oil non-foaming | | | Insoluble haze | Non-foaming oil |

| | Run No. 24 | Run No. 25 | Run No. 26 | Run No. 27 | Run No. 28 | Run No. 29 |
|---|---|---|---|---|---|---|
| Monomers | IB/EF/EA₁₄F | IB/BF/A₁₄F | IB/BF/A₁₄F | IB/EF/BF/A₁₄F | IB/EF/BF EA₁₄F | IB/BA₁₄F |
| IB/fumarate mole charge ratio | 4:1 | 4:1 | 4:1 | 4:1 | 4:1 | 4:1 |
| Product composition, mole ratio | 10:2:8 | 10:5:5 | 10:6.5:3.5 | 10:6:1:3 | 10:2:2:6 | 1:1 |
| Fumarates, average No. alkyl carbon atoms | 6.4 | 8.5 | 7.15 | 5.5 | 5.7 | 8.5 |
| Mole percent catalyst | 0.4% $DCBz_2O_2$ | 0.4% $DCBz_2O_2$ | 0.2% $DCBz_2O_2$ | 0.4% $DCBz_2O_2$ | 0.4% $DCBz_2O_2$ | 0.4% $DCBz_2O_2$ |
| Pressure, p.s.i.g | Autogenous | Autogenous | 25,000-IB | Autogenous | Autogenous | Autogenous |
| Temperature, °C | 50 | 50 | 50 | 50 | 50 | 50 |
| Time, hours | 24 | 24 | 9 | 24 | 24 | 24 |
| Yield, percent | 100c | 100c | 95.1c | 100c | 100c | 100c |
| Percent polymer in conc. of Base Oil 1 | 40 | 30 | 40 | 40 | 40 | 30 |
| Oil visc. in Base Oil 2, 3% polymer— Kinematic viscosities, cs.: | | | | | | |
| At 100° F | 129.73 | 134.62 | 173.39 | | 97.36 | 135.95 |
| At 210° F | 15.58 | 15.26 | 20.02 | | 15.22 | 15.40 |
| Specific viscosities: | | | | | | |
| At 100° F | 0.417 | 0.470 | 0.891 | | 0.062 | 0.483 |
| At 210° F | 0.510 | 0.479 | 0.929 | | 0.467 | 0.484 |
| Efficiency | 1.223 | 1.019 | 1.043 | | 7.532 | 1.002 |
| V.I. | 123.1 | 118.3 | 125.3 | | 139.5 | 118.4 |
| Remarks | | | | Insoluble, not run | Insoluble haze | |

| | Run No. 30 | Run No. 31 | Run No. 32 | Run No. 33 | Run No. 34 | Run No. 35 |
|---|---|---|---|---|---|---|
| Monomers | IB/BF/BA₁₄F | IB/BF/BA₁₄F | IB/BF/BA₁₄F | IB/BF/BA₁₄F | IB/EF/BA₁₄F | IB/BF/A₁₄F |
| IB/fumarate mole charge ratio | 4:1 | 4:1 | 4:1 | 4:1 | 4:1 | 4:1 |
| Product composition, mole ratio | 10:3:7 | 10:4:6 | 10:5:5 | 10:6:4 | 10:2.75:7.25 | 10:6:4 |
| Fumarates, average No. alkyl carbon atoms | 7.1 | 6.7 | 6.25 | 5.8 | 6.7 | 7.6 |
| Mole percent catalyst | 0.4% $DCBz_2O_2$ | 0.4% $DCBz_2O_2$ | 0.4% $DCBz_2O_2$ | 0.4% $DCBz_2O_2$ | 0.4% $DCBz_2O_2$ | 0.4% $DCBz_2O_2$ |
| Pressure, p.s.i.g | Autogenous | Autogenous | Autogenous | Autogenous | Autogenous | Autogenous |
| Temperature, °C | 50 | 50 | 50 | 50 | 50 | 50 |
| Time, hours | 24 | 24 | 24 | 24 | 24 | 24 |
| Yield, percent | 100c | 100c | 100c | 100c | 100c | 100c |
| Percent polymer in conc. of Base Oil 1 | 30 | 30 | 30 | 40 | 28.6 | 40 |
| Oil visc. in Base Oil 2, 3% polymer— Kinematic viscosities, cs.: | | | | | | |
| At 100° F | 133.57 | 131.89 | 130.53 | 110.22 | 127.61 | 140.07 |
| At 210° F | 15.26 | 15.25 | 15.17 | 15.14 | 14.89 | 15.73 |
| Specific viscosities: | | | | | | |
| At 100° F | 0.459 | 0.439 | 0.426 | 0.202 | 0.392 | 0.530 |
| At 210° F | 0.479 | 0.470 | 0.469 | 0.460 | 0.436 | 0.529 |
| Efficiency | 1.044 | 1.071 | 1.101 | 2.277 | 1.112 | 0.989 |
| V.I. | 118.9 | 119.8 | 120.0 | 131.7 | 119.8 | 118.3 |
| Remarks | | | | Haze | | |

| | Run No. 36 | Run No. 37 |
|---|---|---|
| Monomers | IB/BF/A₁₄F | IB/BF/A₁₄F |
| IB/fumarate mole charge ratio | 4:1 | 4:1 |
| Product composition, mole ratio | 10:7:3 | 10:8:2 |
| Fumarates, average No. alkyl carbon atoms | 6.7 | 5.8 |
| Mole percent catalyst | 0.4% $DCBz_2O_2$ | 0.4% $DCBz_2O_2$ |
| Pressure p.s.i.g | Autogenous | Autogenous |
| Temperature, °C | 50 | 50 |
| Time, hours | 24 | 24 |
| Yield, percent | 100c | 100c |
| Percent polym. in conc. of Base Oil 1 | 40 | 40 |
| Oil visc. in Base Oil 2, 3% polymer— Kinematic Viscosities, cs.: | | |
| At 100° F | 135.61 | 105.42 |
| At 210° F | 15.57 | 15.12 |
| Specific viscosities: | | |
| At 100° F | 0.479 | 0.151 |
| At 210° F | 0.501 | 0.465 |
| Efficiency | 1.046 | 3.079 |
| V.I. | 119.8 | 134.4 |
| Remarks | | Haze |

LEGEND

Polymer system:
- IB—Isobutylene
- EF—Diethyl fumarate
- BF—Dibutyl fumarate
- 2EHF—2-ethylhexyl fumarate
- oDF—Di-oxodecyl fumarate
- nDF—Di-n-decyl fumarate
- A₁₄F—Di Adol 14 fumarate (fumarate prepared by esterifying fumaric acid with a mixture of straight chain alcohols of the following composition: 3%–$C_{10}$, 65.7%–$C_{12}$, 20.2%–$C_{14}$, 10.6%–$C_{16}$ and 0.5%–$C_{18}$)
- EnDF—Ethyl-n-decyl fumarate
- EA₁₄F—Ethyl Adol 14 fumarate
- BA₁₄F—Butyl Adol 14 fumarate
- SM—Styrene
- IPAc—Isopropenyl acetate
- VAc—Vinyl acetate
- VOE—β-Hydroxyethyl vinyl ether or vinyloxyethanol
- VEE—Vinylethyl ether

LEGEND—Continued

Catalyst:
$K_2S_2O_8$–AOT—Potassium persulfate-Aerosol OT
$Bz_2O_2$—Benzoyl peroxide
$DCBz_2O_2$—Dichlorobenzoyl peroxide Pressure:
A—Autogenous (isobutylene)
4000 $H_2O$—4000 p.s.i. maintained with water
4000 IB—4000 p.s.i. maintained with isobutylene Yield: Those marked "c" determined by materials balance from oil concentrate preparation. All others determined by polymer precipitation from alcohol Base Oil No. 1:
This is a solvent refined Mid-Continent petroleum lubricating oil having the following properties:

| | |
|---|---|
| Viscosity at 210° F., cs. | 3.94 |
| Viscosity at 100° F., cs. | 21.58 |
| Viscosity index | 75.3 |
| Specific gravity, 25°/25° C. | 0.886 |
| Flash point, Cleveland open cup, ° F. | 375 |

Base Oil No. 2:

This oil is a solvent refined Mid-Continent petroleum lubricating oil having the following properties:

| | |
|---|---|
| Viscosity at 210° F., cs. | 10.39 |
| Viscosity at 100° F., cs. | 91.73 |
| Viscosity index | 103.4 |
| Flash point, Cleveland open cup, ° F. | 450 |

Base Oil No. 3:

This is a mineral hydraulic designed to meet Government specification of MIL-O-5606 as follows:

| | |
|---|---|
| Pour point, ° F. | −75 |
| Flash point, minimum, ° F. | 200 |
| Viscosity at 100° F., cs. | 3.80 |
| Viscosity at 210° F., cs. | 1.37 |
| Viscosity index | 94.6 |
| Specific gravity, 60°/60° F. | 0.862 |

Remarks: Haze—Borderline solubility at room temperature.

The legend set forth above after Table 1 is applicable to Table 1 and the other tables which will be set forth below.

EXAMPLE 4

This is a detailed description of Example 4 which is summarized in Table 1 above. The reactor was a small steel bomb, which was flushed with nitrogen and chilled in an ice bath. To this steel bomb were charged 52.6 g. of di-oxodecyl fumarate, 44.6 g. of isobutylene, 20 ml. hexane and 0.6 g. of benzoyl peroxide. The bomb was then capped and tumbled in an air oven at 75° C. for 24 hours. Then the bomb was rechilled in Dry Ice, opened and any excess isobutylene allowed to evaporate upon warming to room temperature. The hexane was removed and the polymer purified by dissolving in benzene and precipitating from ethyl alcohol. Pressure during the run was autogenous pressure generated by isobutylene at the temperature of reaction. Yield of polymer product was 93.3%. A sample of the polymer product was dissolved in Base Oil No. 1 to make a 30% concentrate. This 30% concentrate was diluted to 3% polymer with Base Oil No. 2 for viscosity measurements. The results of the viscosity measurements are reported in Table 1.

EXAMPLE 10

This is a detailed description of Example 10 summarized in Table 1. The reactor used in this experiment was a magnetically stirred reactor called a "Magne-Dash" reactor designed for high pressure operation. To the Magne-Dash reactor were added 118.6 g. of isobutylene, 34.9 g. of di-oxodecyl fumarate, 15.2 g. of ethyl fumarate and 0.6 g. of benzoyl peroxide. The reactor was then flushed with nitrogen and pressured up with water to 3500 p.s.i.g. Reaction period at 70° C. was 24 hours. The 3500 p.s.i.g. was not maintained since the run continued over night and the next morning the pressure was 300 p.s.i.g. in the bomb. The polymer was dissolved in 117.5 g. of Base Oil No. 1 and 400 ml. of benzene. The water and benzene were removed under water pump vacuum to a pot temperature of 180° C. Yield of polymer was 57.6 g. (96.1% yield). An additional 16.9 g. of process oil was added to make the 30% concentrate. A sample of the polymer concentrate was diluted to 3% polymer with Base Oil No. 2 for viscosity measurements. The resulting oil was hazy indicating insolubility of the polymer and the oil was non-foaming. In this experiment a little too much ethyl fumarate was used as indicated by the insolubility, the average number of alkyl carbon atoms being 6.0.

EXAMPLE 20

This experiment was carried out in a high pressure rocking type bomb. To the bomb were charged 71.25 g. of di-"Adol 14" fumarate, 23.84 g. of diethyl fumarate, 62.1 g. of isobutylene and 0.82 g. of 2,4-dichloro benzoyl peroxide catalyst. This catalyst contained 50% of the active ingredient, the peroxide. The bomb was then pressured up to 25,000 p.s.i.g. with isobutylene and maintained at 50° C. for 13 hours. For the last 4 hours of reaction time giving a total time of 17 hours the reaction mixture was maintained at 60° C. To the polymer product was added Base Oil No. 1 to make a 40% concentrate of the polymer. Excess isobutylene was then stripped off the polymer concentrate and an additional 15 g. of the oil added to readjust to 40% polymer concentrate. Yield was 93.6% polymer.

EXAMPLE 29

The procedure and equipment used in this example was the same as was used in Example 4. To the small bomb was charged 31.5 g. of isobutylene, 52.1 g. of butyl "Adol 14" fumarate and 0.9 g. of 2,4-dichloro benzoyl peroxide (50% active). Pressure in the run was autogenous established by the presence of excess isobutylene. Reaction temperature was 50° C. and polymerization run time was 24 hours. At the end of the polymerization run Base Oil No. 1 was added to the polymer to make a 30% concentrate and the usual stripping and readjusting of the base oil was carried out to establish the 30% polymer concentrate in Base Oil No. 1. As usual a sample of the 30% concentrate was diluted with Base Oil No. 2 to 3% polymer for viscosity measurements.

EXAMPLE 41

This example describes the preparation of an isobutylene fumarate polymer containing a third monomer. The experiment was carried out in equipment and in a manner similar to that described in Example 4. To the small bomb was charged 17.4 g. of isobutylene, 2.6 g. of isopropenyl acetate, 53.1 g. of di-"Adol 14" fumarate and 0.63 g. of 50% active 2,4-dichloro benzoyl peroxide. The pressure was autogenous established by the presence of excess isobutylene, reaction temperature 50° C. and reaction time 5 days. Base Oil No. 1 was added to the polymer product to make up a 40% polymer concentrate and the usual stripping and oil adjusting carried out. Yield was 98.0%. A sample of the polymer concentrate was diluted with Base Oil No. 2 to 3% polymer and viscosity measurements were made.

In Table 2 below are summarized a number of runs wherein isobutylene and fumarates are polymerized with a third monomer. Run 41 of this table is discussed in detail above. In column 3 of this table a 4:1 molar excess of isobutylene is shown and this means a 4:1 excess over the sum of the number of moles of the fumarate plus the third monomer.

Table 2

|  | Run No. 38 | Run No. 39 | Run No. 40 | Run No. 41 | Run No. 42 | Run No. 43 |
|---|---|---|---|---|---|---|
| Monomers | IB/VOE/$A_{14}F$ | IB/VOE/$A_{14}F$ | IB/IPAc/$A_{14}F$ | IB/IPAc/$A_{14}F$ | IB/VEE/$A_{14}F$ | IB/VEE/$A_{14}F$. |
| IB/fumarate mole charge ratio | 4:1 | 4:1 | 4:1 | 4:1 | 4:1 | 4:1. |
| Product composition, mole ratio | 2:2:4 | 3:1:4 | 2:2:4 | 3:1:4 | 2:2:4 | 3:1:4. |
| Mole percent catalyst | 0.4% $DCBz_2O_2$ | 0.4% $DCBz_2O_2$ | 0.4% $DCBz_2O_2$ | 0.4% $DCBz_2O_2$ | 0.4% $DCBz_2O_2$ | 0.4% $DCBz_2O_2$. |
| Pressure, p.s.i.g. | Autogenous | Autogenous | Autogenous | Autogenous | Autogenous | Autogenous. |
| Temperature, °C | 50 | 50 | 50 | 50 | 50 | 50. |
| Time | 5 days | 5 days | 5 days | 5 days | 5 days | 5 days. |
| Yield, percent | 96.3c | 97.5c | 95.5c | 98.0c | 97.5c | 98.7c. |
| Percent polymer in conc. of Base Oil 1 | 40 | 40 | 40 | 40 | 40 | 40. |
| Oil visc. in Base Oil 2, 3% polymer— | | | | | | |
| Kinematic Viscosities, cs.: | | | | | | |
| At 100° F | 102.22 | 113.83 | 137.57 | 144.05 | 110.80 | 121.55. |
| At 210° F | 11.71 | 12.89 | 15.44 | 15.97 | 12.65 | 13.65. |
| Specific viscosities: | | | | | | |
| At 100° F | 0.115 | 0.243 | 0.501 | 0.573 | 0.209 | 0.328. |
| At 210° F | 0.129 | 0.249 | 0.489 | 0.547 | 0.219 | 0.322. |
| Efficiency | 1.122 | 1.025 | 0.976 | 0.955 | 1.048 | 0.982. |
| V.I. | 110.2 | 112.8 | 117.8 | 117.8 | 112.9 | 114.2. |

EXAMPLE 45

This experiment describes the preparation of a polymer having no isobutylene therein. The experiment was carried out in the same type of equipment and in the same manner as Example 1. To a "Coke" bottle were charged 24.65 g. of di-oxodecyl fumarate, 5.35 g. of vinyl acetate, 10 ml. of hexane and 0.3 g. of benzoyl peroxide catalyst. Reaction temperature was 75° C. and reaction time 24 hours. A 30% concentrate of polymer and oil was made in the usual manner and the volatiles stripped off. Yield of polymer was 94.7%. A sample of the 30% concentrate was diluted with Base Oil No. 2 to 3% polymer and viscosity measurements were made.

In Table 3 below are summarized a number of runs of polymers made containing fumarate monomer plus another monomer but no isobutylene monomer. Run 45 described in detail above exemplifies these experiments.

liquid flows. An empty 600 ml. beaker is placed under the double discharge tube. Oilers are opened on the machine and adjusted to several drops/minute. Then the motor switch is turned on. The motor switch is turned off when the fluid level reaches the neck of the reservoir. (This will prevent the introduction of air into the feed system.) The reservoir is once again filled with the pre-test flush fluid and the above sequence of steps repeated.

Now the equipment is ready for the regular shear test. A fresh sample of the test fluid is poured into the reservoir (minimum of 150 ml. plus 50 ml. for each intermediate sample to be taken). The rubber connector hose between the reservoir and the machine is squeezed to expel any air trapped therein. A clean 600 ml. beaker is placed under the discharge nozzle. Then the motor switch is turned on. The motor switch is turned off when the fluid level reaches the neck of the reservoir.

Table 3

|  | Run. No 44 | Run No. 45 | Run No. 46 | Run No. 37 | Run No. 48 |
|---|---|---|---|---|---|
| Monomers | oDF | oDF/VAc | oDF/IPAc | oDF/EF | oDF/SM. |
| Molar charge ratio | | 1:1 | 1:1 | 80:20 wt. percent | 1:1. |
| Solvent | Hexane | Hexane | Hexane | Hexane | Hexane. |
| Catalyst and weight percent | 3 wt. percent $Bz_2O_2$ | 3 wt. percent $Bz_2O_2$ | 3 wt. percent $Bz_2O_2$ | 3 wt. percent $Bz_2O_2$ | 3 wt. percent $Bz_2O_2$. |
| Temperature, °C | 75 | 75 | 75 | 75 | 75. |
| Time, hours | 24 | 24 | 24 | 24 | 24. |
| Yield, percent | 70.0 | 94.7 | 85.0 | 68.0 | 83.3. |
| Percent polymer in conc. of Base Oil 1 | | 30 | 30 | | 30. |
| Oil visc. in Base Oil 2, 3% polymer— | | | | | |
| Kinematic visc., cs.: | | | | | |
| At 100° F | | 117.5 | 104.9 | | 105.8. |
| At 210° F | | 14.08 | 12.06 | | 12.22. |
| Specific visc. | | | | | |
| At 100° F | | 0.082 | 0.144 | | 0.155. |
| At 210° F | | 0.358 | 0.163 | | 0.178. |
| Efficiency | | 1.270 | 1.132 | | 1.148. |
| V.I. | | 120.5 | 111.7 | | 112.7. |
| Remarks | | 30% oil conc. | 30% oil conc. | | 30% oil conc. |

In Table 4 below the results of shear tests are compared between a polymer of the invention, the product of Example 20, and Acryloid 710 which is a good commercial viscosity index improver having satisfactory shear.

The shear test is a diesel injector shear test. This test is used to evaluate the viscosity-stability of fluids. This is accomplished by passing the fluids through a diesel injector for a number of cycles. The actual diesel injector test machine used was a General Motors diesel head assembly, 1-71 Series, No. 5154288; with injector No. 5226710; operating at 1800 cycles per minute.

In a pre-test flush the glass reservoir of the equipment is filled with test fluid to the level of the supporting ring; about 200 ml. of test fluid. The injector bleed valve is opened and the equipment is allowed to drain until The beaker of sheared fluid is removed and stirred or mixed lightly to collapse any foam. Then approximately 1 ounce of the sheared fluid is poured off into a four-ounce bottle if a sample is desired. The remainder of the fluid is poured back into the reservoir. The above cycle of steps is repeated until the desired number of cycles has been run (normally ten to twelve cycles are necessary. Further shearing results in little additional viscosity decrease).

The viscosity of the samples is determined and the results are reported as percentage change of viscosity from the original fluid viscosity. It is desirable to shear a known reference fluid for comparison to the unknown fluids.

After the completion of the shearing run the motor switch is turned on and the system is run dry, then three 100-ml. portions of Stoddard solvent is used to flush out the system.

*Table 4*

| Run No. | Monomers | Oil viscosities in Base Oil 2, 3% polymer | | |
|---|---|---|---|---|
| | | Kinematic visc. (cs.) at 210° F. | | Percent polym. shear |
| | | Before shear | After shear | |
| 20 | IB/EF/A₁₄F | 19.40 | 14.73 | 50.87 |
| | Acryloid 710 [1] | 19.56 | 14.12 | 58.24 |

[1] A commercial polymethacrylate V.I. improver.

It is seen from Table 4 that the polymer of the invention has as good or somewhat better shear properties than the commercial V.I. improvers.

To test the compatibility in concentrated solutions of isobutylene fumarate polymers of the invention with some other lubricating oil additives, mixtures of additives were made and compatibility observations carried out. The results of these compatibility tests are summarized in Table 5 below.

anhydride copolymer similar to that used for pour dep. A, which polymer was esterified to the extent of about 65% with a mixture of straight-chain alcohols having 3.0%–$C_{10}$, 65.7%–$C_{12}$, 20.2%–$C_{14}$, 10.6%–$C_{16}$ and 0.5%–$C_{18}$ alcohols and the balance of the esterification being accomplished with N,N-dimethyl-1,3-propylenediamine to give a 65/35 ester imide copolymer. In addition to pour depressant A, two other pour point depressants were tested for compatibility with the isobutylene/fumarate polymers. The first of these pour point depressants is a commercial additive "Acryloid 150" which is a methacrylic ester polymer, and the other of these additives is another commercial pour point depressant called "Santopour C."

It will be seen from an examination of Table 5 that the isobutylene/fumarate polymers are compatible in concentrated oil solutions with pour depressant A and the detergent additive but are not compatible with the "Acryloid 150" and the "Santopour C" polymers. In dilute solutions (up to 5–7% total additive) all additives were compatible with polymers of the invention, however.

In Table 6 below is set forth a comparison of the hydrolysis stability of a number of different additives with the isobutylene fumarate additive of the invention. In this hydrolysis method a 2 to 2½ weight percent polymer

*Table 5*

| No. | IB/fumarate | | Pour depressant | Low temp. detergent | Compatibility ratings | | | | | |
|---|---|---|---|---|---|---|---|---|---|---|
| | Run No. | Monomers | | | 1 hr. | 1 day | 5 days | 1 week | 4 weeks | 8 weeks |
| 1 | 15 | IB/nDF | Pour dep. A | | Clear | Clear | Clear | Clear | Clear | Clear-compatible. |
| 2 | 15 | IB/nDF | | Detergent | do | do | do | do | do | Do. |
| 3 | 11 | IB/EF/nDF | Pour dep. A | | do | V. sl. haze [1] | V. sl. haze | V. sl. haze | V. sl. haze | V. sl. haze. |
| 4 | 11 | IB/EF/nDF | | Detergent | do | Clear | Clear | Clear | Clear | Clear-compatible. |
| 5 | 10 | IB/EF/oDF | Pour dep. A | | do | do | do | do | do | Do. |
| 6 | 10 | IB/EF/oDF | | Detergent | do | do | do | do | do | Do. |
| 7 | 14 | IB/EF/nDF | Acryloid 150 | | Hazy | Hazy | 2-layers | | | |
| 8 | 14 | IB/EF/nDF | Santopour C | | do | Turbid | Turbid | 2 layers | | |

[1] V. sl. means "very slight."

In Table 5 the composition of all blends was adjusted to give 15 parts of pour point depressant polymer or low temperature detergent polymer to 100 parts of V.I. improver (isobutylene/fumarate) polymer giving a total of 115 parts of polymer additives as a 30% concentrate in Base Oil No. 1. Pour Dep. A was an ethylene/maleic anhydride copolymer having a specific viscosity of about 0.1 determined from a 1% solution of the polymer in dimethyl formamide at 25° C., which polymer was esterified with a mixture of straight-chain alcohols having 2.5%–$C_{10}$, 55.5%–$C_{12}$, 21.0%–$C_{14}$, 10.2%–$C_{16}$ and 10.8%–$C_{18}$ alcohols therein. The particular detergent additive used in compatibility tests of Table 5 was a detergent prepared from a 0.1 specific viscosity ethylene/maleic solution (0.05 mol carboxyl equivalent) was made up in 250 ml. of benzene/isopropanol (1:1 by volume), and to this solution was added 0.05 mol of potassium hydroxide. This mixture was then heated at 70° C. during the duration of the test with samples being withdrawn periodically for determination of potassium hydroxide consumption. Blank experiments were run at the same time as the polymer experiments. These hydrolysis tests are summarized in Table 6 below.

*Table 6*

| Run No. | Polymer | Fumarate, av. No. alkyl carbon atoms | Percent hydrolysis after specified time | | | | |
|---|---|---|---|---|---|---|---|
| | | | 0.5 hr. | 1.0 hr. | 4.0 hrs. | 8.0 hrs. | 24.0 hrs. |
| | 90/10 decyl/ethyl polyacrylate | | [1] 80.0 | | | | |
| | "Acryloid 710" | | 12 | 13 | 15 | 17 | 21 |
| | EMA "Lorol" ester | | 65 | 72 | [1] 85 | | |
| 44 | Poly oDF | | 34 | | 42 | 49 | 51 |
| 47 | EF/oDF | | 27 | 33 | 40 | 45 | 53 |
| 1 | IB/BF (1:1) | 4.0 | 1 | | 3 | | 4 |
| 2 | IB/2 EHF (1:1) | 8.0 | 5 | | 6 | | 7 |
| 3 | IB/oDF (1:1) | 10.0 | 9 | 9 | 9 | 9 | 9 |
| 4 | IB/oDF (1:1) | 10.0 | 15 | 17 | | 20 | 22 |
| 12 | IB/nDF (1:1) | 10.0 | 9 | 11 | 12 | | 15 |
| 5 | IB/EF/oDF (10:5:5) | 6.0 | 12 | 14 | | 16 | 21 |
| 6 | IB/EF/oDF (10:5:5) | 6.0 | 10 | 13 | | 14 | 15 |
| 13 | IB/EF/nDF (10:4:6) | 6.8 | 8 | 10 | 11 | | 14 |
| 14 | IB/EF/nDF (10:5:5) | 6.0 | 7 | 8 | 9 | | 12 |
| 45 | VAc/oDF (1:1) | | [2] 100 | [3] 87 | | | |
| 46 | IPAc/oDF (1:1) | | [2] 100 | [3] 92 | | | |
| 48 | SM/oDF (1:1) | | 17 | 23 | 32 | 40 | 54 |

[1] Gel.  [2] Using 2 equivalents of KOH.  [3] Using 3 equivalents of KOH.

In Table 6 a number of different polymers are compared with polymers of the invention in hydrolysis stability. The "Acryloid 710" is a commercial polymethacrylate V.I. improver and the EMA "Lorol" ester is an ester of ethylene/maleic anhydride copolymer wherein the alcohol used was a mixture of long-chain straight-chain alcohols marketed under the trade name "Lorol." Other polymers can be identified from the legend set forth after Table 1 or the detailed description in Table 6. It will be noted that none of the polymers which are not polymers of the invention even compare in hydrolysis stability to the polymers of the invention except the "Acryloid 710," which is a good commercial V.I. improver of satisfactory hydrolysis stability. It will be further noted in analyzing the data of the table that optimum hydrolysis stability is attained by certain combinations of isobutylene and certain fumarate mixtures.

The superior hydrolysis stability of polymers of the invention is especially demonstrated in the presence of barium detergents and compared with one well known type of V.I. improver in Tables 7–13 below. The two commercial V.I. improvers are "Paratone 430 and 460" which are copolymers of vinyl acetate and fumarates. The comparison is made by incorporating a "Paratone" or a V.I. improver of the invention and one of three different barium detergents in Base Oil No. 2 in the normal amounts in which these additives would be added to a mineral lubricating oil in use. The stability of each of these additive blends in mineral oil is checked after varying storage periods at room temperature or 60° C. by measuring viscosities at 100° and 210° F. Increasing viscosity provides indirect evidence of hydrolysis and the greater the rate and amount of viscosity increase up to gelation, the more unstable is the additive combination.

*Table 7*

"PARATONE 430" PLUS DETERGENTS

| Percent "Paratone 430" | Percent Ba detergent | Blending | Specific viscosity | | Percent specific viscosity increase | |
|---|---|---|---|---|---|---|
| | | | 100° F. | 210° F. | 100° F. | 210° F. |
| | "Amoco 121": 2% | ½ hr.—RT [1] | 0.085 | 0.083 | | |
| | Experimental Ba detergent: 2% | ½ hr.—RT | 0.036 | 0.029 | | |
| | "Santolube 333": 2% | ½ hr.—RT | | | | |
| 3% | None | ½ hr.—RT | 0.690 | 0.925 | | |
| 3% | None | 24 hr.—60° C | 0.681 | 0.929 | | |
| 3% | None | 72 hr.—60° C | 0.690 | 0.929 | | |
| 3% | None | 168 hr.—60° C | 0.685 | 0.915 | | |
| | "Amoco 121": | | (0.775)c | (1.008)c | c | c |
| 3% | 2% | ½ hr.—RT | 1.063 | 2.974 | 37.2 | 195.0 |
| 3% | 2% | 1 hr.—60° C | 1.637 | 2.814 | 111.2 | 179.2 |
| 3% | 2% | 24 hr.—60° C | 3.104 | 4.349 | 300.5 | 331.4 |
| 3% | 2% | 72 hr.—60° C | 4.005 | 5.288 | 416.8 | 424.6 |
| 3% | 2% | 168 hr.—60° C | 4.648 | 6.182 | 499.7 | 513.3 |
| | Experimental Ba detergent: | | (0.726)c | (0.954)c | c | c |
| 3% | 2% | ½ hr.—RT | 0.896 | 1.796 | 23.4 | 87.1 |
| 3% | 2% | 1 hr.—60° C | 1.215 | 1.653 | 67.4 | 73.3 |
| 3% | 2% | 24 hr.—60° C | 1.489 | 2.007 | 105.1 | 110.4 |
| 3% | 2% | 72 hr.—60° C | 1.673 | 2.214 | 130.4 | 132.1 |
| 3% | 2% | 168 hr.—60° C | 1.867 | 2.461 | 157.2 | 158.0 |
| | "Santolube 333": | | | | | |
| 3% | 2% | ½ hr.—RT | 1.049 | 1.568 | 52.0 | 69.5 |
| 3% | 2% | 1 hr.—60° C | 1.177 | 1.583 | 70.6 | 71.1 |
| 3% | 2% | 24 hr.—60° C | 1.372 | 1.774 | 98.8 | 91.8 |
| 3% | 2% | 72 hr.—60° C | 1.552 | 2.007 | 124.9 | 117.0 |
| 3% | 2% | 168 hr.—60° C | 1.749 | 2.271 | 153.5 | 145.5 |

[1] RT means room temperature.
c—Corrected for viscosity contribution of detergent.

*Table 8*

"PARATONE 460" PLUS DETERGENTS

| Percent "Paratone 460" | Percent Ba detergent | Blending | Specific viscosity | | Percent specific viscosity increase | |
|---|---|---|---|---|---|---|
| | | | 100° F. | 210° F. | 100° F. | 210° F. |
| 3% | None | ½ hr.—RT [1] | 0.838 | 1.281 | | |
| 3% | None | 24 hr.—60° C | 0.829 | 1.277 | | |
| 3% | None | 72 hr.—60° C | 0.834 | 1.262 | | |
| 3% | None | 168 hr.—60° C | 0.817 | 1.231 | | |
| | "Amoco 121": | | (0.923)c | (1.364)c | c | c |
| 3% | 2% | ½ hr.—RT | 1.273 | 5.039G | 37.8 | 269.4 |
| 3% | 2% | 1 hr.—60° C | 2.158 | 4.112G | 133.8 | 201.5 |
| 3% | 2% | 24 hr.—60° C | 3.389 | 6.871 | 267.2 | 403.7 |
| 3% | 2% | 72 hr.—60° C | 5.449 | 8.835G | 490.4 | 547.7 |
| 3% | 2% | 168 hr.—60° C | 6.412 | 10.337G | 594.3 | 657.8 |
| | Experimental Ba detergent: | | (0.874)c | (1.310)c | c | c |
| 3% | 2% | ½ hr.—RT | 1.067 | 2.304 | 22.1 | 75.9 |
| 3% | 2% | 1 hr.—60° C | 1.377 | 2.295 | 57.6 | 75.2 |
| 3% | 2% | 24 hr.—60° C | 1.878 | 2.757 | 114.9 | 110.5 |
| 3% | 2% | 72 hr.—60° C | 2.123 | 3.061 | 142.9 | 133.7 |
| 3% | 2% | 168 hr.—60° C | 2.301 | 3.292 | 163.3 | 151.3 |
| | "Santolube 33": | | | | | |
| 3% | 2% | ½ hr.—RT | 1.275 | 2.114 | 52.1 | 65.0 |
| 3% | 2% | 1 hr.—60° C | 1.498 | 2.160 | 78.8 | 68.6 |
| 3% | 2% | 24 hr.—60° C | 1.692 | 2.330 | 101.9 | 81.9 |
| 3% | 2% | 72 hr.—60° C | 1.881 | 2.556 | 124.5 | 99.5 |
| 3% | 2% | 168 hr.—60° C | 2.002 | 2.684 | 138.9 | 109.5 |

[1] RT means room temperature.
G—Gelled out in 210° F. viscosity tube after 30-60 minutes.
c—Corrected for viscosity contribution of detergent.

Table 9

IB/EF/A₁₄F (EXAMPLE 20) PLUS DETERGENTS

| Percent Ex. 20 | Percent Ba detergent | Blending | Specific viscosity | | Percent specific viscosity increase | |
|---|---|---|---|---|---|---|
| | | | 100° F. | 210° F. | 100° F. | 210° F. |
| 3% | None | 1 hr.—RT¹ | 0.846 | 0.917 | | |
| 3% | None | 24 hr.—60° C | 0.838 | 0.920 | | |
| 3% | None | 168 hr.—60° C | 0.837 | 0.915 | | |
| | "Amoco 121": | | (0.931)c | (1.000)c | c | c |
| 3% | 2% | 1 hr.—RT | 1.059 | 1.167 | 13.7 | 16.7 |
| 3% | 2% | 1 hr.—60° C | 1.084 | 1.191 | 16.4 | 19.1 |
| 3% | 2% | 24 hr.—60° C | 1.152 | 1.189 | 23.7 | 18.9 |
| 3% | 2% | 72 hr.—60° C | 1.165 | 1.200 | 25.1 | 20.0 |
| 3% | 2% | 168 hr.—60° C | 1.178 | 1.210 | 26.5 | 21.0 |
| 3% | 2% | 336 hr.—60° C | 1.189 | 1.231 | 27.7 | 23.1 |
| | Experimental Ba detergent: | | (0.882)c | (0.946)c | c | c |
| 3% | 2% | 1 hr.—RT | 0.934 | 1.052 | 5.9 | 11.2 |
| 3% | 2% | 1 hr.—60° C | 0.970 | 1.085 | 10.0 | 14.7 |
| 3% | 2% | 24 hr.—60 °C | 1.037 | 1.112 | 17.6 | 17.5 |
| 3% | 2% | 72 hr.—60° C | 1.073 | 1.143 | 21.7 | 20.8 |
| 3% | 2% | 168 hr.—60° C | 1.101 | 1.175 | 24.8 | 24.8 |
| 3% | 2% | 336 hr.—60° C | 1.111 | 1.197 | 26.0 | 26.5 |
| | "Santolube 333": | | | | | |
| 3% | 2% | 1 hr.—RT | 0.903 | 0.972 | 6.7 | 6.0 |
| 3% | 2% | 1 hr.—60° C | 0.904 | 0.976 | 6.9 | 6.4 |
| 3% | 2% | 24 hr.—60° C | 0.919 | 0.986 | 8.6 | 7.5 |
| 3% | 2% | 72 hr.—60° C | 0.932 | 0.993 | 10.2 | 8.3 |
| 3% | 2% | 168 hr.—60° C | 0.944 | 1.002 | 11.6 | 9.3 |
| 3% | 2% | 336 hr.—60° C | 0.958 | 1.009 | 13.2 | 10.0 |

¹ RT means room temperature.
c—Corrected for viscosity contribution of detergent.

Table 10

IB/BF/A₁₄F (EXAMPLE 26) PLUS DETERGENTS

| Percent Ex. 26 | Percent Ba detergent | Blending | Specific viscosity | | Percent specific viscosity increase | |
|---|---|---|---|---|---|---|
| | | | 100° F. | 210° F. | 100° F. | 210° F. |
| 3% | None | 1 hr.—RT¹ | 0.917 | 0.954 | | |
| 3% | None | 24 hr.—60° C | 0.914 | 0.951 | | |
| 3% | None | 168 hr.—60° C | 0.909 | 0.947 | | |
| | "Amoco 121": | | (1.002)c | (1.037)c | c | c |
| 3% | 2% | 1 hr.—RT | 1.096 | 1.124 | 9.4 | 8.4 |
| 3% | 2% | 1 hr.—60° C | 1.096 | 1.121 | 9.4 | 8.1 |
| 3% | 2% | 24 hr.—60° C | 1.111 | 1.124 | 10.9 | 8.4 |
| 3% | 2% | 72 hr.—60° C | 1.115 | 1.129 | 11.3 | 8.9 |
| 3% | 2% | 168 hr.—60° C | 1.118 | 1.129 | 11.6 | 8.9 |
| 3% | 2% | 336 hr.—60° C | 1.122 | 1.133 | 12.0 | 9.3 |
| | Experimental Ba detergent: | | (0.953)c | (0.983)c | c | c |
| 3% | 2% | 1 hr.—RT | 0.986 | 1.015 | 3.5 | 3.3 |
| 3% | 2% | 1 hr.—60° C | 0.990 | 1.019 | 3.9 | 3.7 |
| 3% | 2% | 24 hr.—60° C | 1.010 | 1.014 | 6.0 | 3.2 |
| 3% | 2% | 72 hr.—60° C | 1.016 | 1.014 | 6.6 | 3.2 |
| 3% | 2% | 168 hr.—60° C | 1.022 | 1.019 | 7.2 | 3.7 |
| 3% | 2% | 336 hr.—60° C | 1.023 | 1.019 | 7.3 | 3.7 |
| | "Santolube 333": | | | | | |
| 3% | 2% | 1 hr.—RT | 0.913 | 0.951 | −0.4 | −0.3 |
| 3% | 2% | 1 hr.—60° C | 0.913 | 0.951 | −0.4 | −0.3 |
| 3% | 2% | 24 hr.—60° C | 0.920 | 0.956 | 0.3 | 0.2 |
| 3% | 2% | 72 hr.—60° C | 0.926 | 0.961 | 1.0 | 0.7 |
| 3% | 2% | 168 hr.—60° C | 0.932 | 0.966 | 1.6 | 1.3 |
| 3% | 2% | 336 hr.—60° C | 0.942 | 0.966 | 2.7 | 1.3 |

¹ RT means room temperature.
c—Corrected for viscosity contribution of detergent.

Table 11
IB/EA₁₄F (EXAMPLE 23) PLUS DETERGENTS

| Percent Ex. 23 | Percent Ba detergent | Blending | Specific viscosity | | Percent specific viscosity increase | |
|---|---|---|---|---|---|---|
| | | | 100° F. | 210° F. | 100° F. | 210° F. |
| 3% | None | 1 hr.—RT¹ | 0.480 | 0.481 | | |
| 3% | None | 24 hr.—60° C | 0.476 | 0.476 | | |
| 3% | None | 168 hr.—60° C | 0.475 | 0.479 | | |
| | "Amoco 121": | | (0.565)c | (0.564)c | c | c |
| 3% | 2% | 1 hr.—RT | 0.639 | 0.637 | 13.1 | 12.9 |
| 3% | 2% | 1 hr.—60° C | 0.648 | 0.637 | 14.7 | 12.9 |
| 3% | 2% | 24 hr.—60° C | 0.671 | 0.646 | 18.6 | 14.5 |
| 3% | 2% | 72 hr.—60° C | 0.677 | 0.651 | 19.8 | 15.4 |
| 3% | 2% | 168 hr.—60° C | 0.681 | 0.656 | 20.5 | 16.3 |
| | Experimental Ba detergent: | | (0.516)c | (0.510)c | c | c |
| 3% | 2% | 1 hr.—RT | 0.549 | 0.564 | 6.4 | 9.6 |
| 3% | 2% | 1 hr.—60° C | 0.562 | 0.566 | 8.9 | 11.0 |
| 3% | 2% | 24 hr.—60° C | 0.610 | 0.595 | 18.2 | 16.7 |
| 3% | 2% | 72 hr.—60° C | 0.628 | 0.600 | 21.7 | 17.6 |
| 3% | 2% | 168 hr.—60° C | 0.644 | 0.619 | 24.8 | 21.4 |
| | "Santolube 333": | | | | | |
| 3% | 2% | 1 hr.—RT | 0.509 | 0.509 | 6.0 | 5.8 |
| 3% | 2% | 1 hr.—60° C | 0.510 | 0.509 | 6.3 | 5.8 |
| 3% | 2% | 24 hr.—60° C | 0.515 | 0.509 | 7.3 | 5.8 |
| 3% | 2% | 72 hr.—60° C | 0.516 | 0.509 | 7.5 | 5.8 |
| 3% | 2% | 168 hr.—60° C | 0.522 | 0.514 | 8.8 | 6.9 |

¹ RT means room temperature.
c—Corrected for viscosity contribution of detergent.

Table 12
IB/A₁₄F (EXAMPLE 19) PLUS DETERGENTS

| Percent Ex. 19 | Percent Ba detergent | Blending | Specific viscosity | | Percent specific viscosity increase | |
|---|---|---|---|---|---|---|
| | | | 100° F. | 210° F. | 100° F. | 210° F. |
| 3% | None | 1 hr.—RT¹ | 0.401 | 0.396 | | |
| 3% | None | 24 hrs.—60° C | 0.400 | 0.393 | | |
| 3% | None | 168 hrs.—60° C | 0.400 | 0.388 | | |
| | "Amoco 121": | | (0.486)c | (0.479)c | c | c |
| 3% | 2% | 1 hr.—RT | 0.541 | 0.517 | 11.3 | 7.9 |
| 3% | 2% | 1 hr.—60° C | 0.539 | 0.519 | 10.9 | 8.4 |
| 3% | 2% | 25 hrs.—60° C | 0.527 | 0.507 | 8.4 | 5.8 |
| 3% | 2% | 72 hrs.—60° C | 0.528 | 0.496 | 8.6 | 3.5 |
| 3% | 2% | 168 hrs.—60° C | 0.522 | 0.501 | 7.4 | 4.6 |
| | Experimental Ba detergent: | | (0.437)c | (0.425)c | c | c |
| 3% | 2% | 1 hr.—RT | 0.457 | 0.437 | 4.6 | 2.8 |
| 3% | 2% | 1 hr.—60° C | 0.458 | 0.434 | 4.8 | 2.1 |
| 3% | 2% | 24 hrs.—60° C | 0.465 | 0.434 | 6.4 | 2.1 |
| 3% | 2% | 72 hrs.—60° C | 0.465 | 0.434 | 6.4 | 2.1 |
| 3% | 2% | 168 hrs.—60° C | 0.465 | 0.434 | 6.4 | 2.1 |
| | "Santolube 333": | | | | | |
| 3% | 2% | 1 hr.—RT | 0.382 | 0.379 | −4.7 | −4.3 |
| 3% | 2% | 1 hr.—60° C | 0.379 | 0.376 | −5.5 | −5.1 |
| 3% | 2% | 24 hrs.—60° C | 0.385 | 0.383 | −4.0 | −3.3 |
| 3% | 2% | 72 hrs.—60° C | 0.385 | 0.373 | −4.0 | −5.8 |
| 3% | 2% | 168 hrs.—60° C | 0.385 | 0.376 | −4.0 | −5.1 |

¹ RT means room temperature.
c—Corrected for viscosity contribution of detergent.

Table 13
IB/BA₁₄F (EXAMPLE 29) PLUS DETERGENTS

| Percent Ex. 29 | Percent Ba detergent | Blending | Specific viscosity | | Percent specific viscosity increase | |
|---|---|---|---|---|---|---|
| | | | 100° F. | 210° F. | 100° F. | 210° F. |
| 3% | None | 1 hr.—RT¹ | 0.497 | 0.486 | | |
| 3% | None | 24 hr.—60° C | 0.499 | 0.486 | | |
| 3% | None | 168 hr.—60° C | 0.497 | 0.491 | | |
| | "Amoco 121": | | (0.582)c | (0.569)c | c | c |
| 3% | 2% | 1 hr.—RT | 0.643 | 0.634 | 10.5 | 11.4 |
| 3% | 2% | 1 hr.—60° C | 0.646 | 0.637 | 11.0 | 12.0 |
| 3% | 2% | 24 hr.—60° C | 0.658 | 0.632 | 13.1 | 11.1 |
| 3% | 2% | 72 hr.—60° C | 0.659 | 0.642 | 13.2 | 12.8 |
| 3% | 2% | 168 hr.—60° C | 0.662 | 0.634 | 13.7 | 11.4 |
| | Experimental Ba detergent: | | (0.533)c | (0.515)c | c | c |
| 3% | 2% | 1 hr.—RT | 0.552 | 0.546 | 3.6 | 6.0 |
| 3% | 2% | 1 hr.—60° C | 0.555 | 0.558 | 4.1 | 8.3 |
| 3% | 2% | 24 hr.—60° C | 0.572 | 0.554 | 7.3 | 7.6 |
| 3% | 2% | 72 hr.—60° C | 0.580 | 0.557 | 8.8 | 8.2 |
| 3% | 2% | 168 hr.—60° C | 0.584 | 0.561 | 9.6 | 8.9 |
| | "Santolube 333": | | | | | |
| 3% | 2% | 1 hr.—RT | 0.487 | 0.486 | −2.0 | 0.0 |
| 3% | 2% | 1 hr.—60° C | 0.487 | 0.486 | −2.0 | 0.0 |
| 3% | 2% | 24 hr.—60° C | 0.491 | 0.491 | −1.2 | 1.0 |
| 3% | 2% | 72 hr.—60° C | 0.490 | 0.493 | −1.4 | 1.4 |
| 3% | 2% | 168 hr.—60° C | 0.497 | 0.491 | 0.0 | 1.0 |

¹ RT means room temperature.
c=Corrected for viscosity contribution of detergent.

In the Tables 7–13 above a number of different additives are defined by trade names. "Paratone 430" and "Paratone 460" are both vinyl acetate/fumarate copolymers, the latter being of higher molecular weight than the former and possibly being made of different fumarates. The detergent additive "Amoco 121" is a basic barium detergent lubricating oil additive which is a $P_2S_5$-hydrocarbon reaction product containing an appreciable amount of barium. The experimental barium detergent is a different type of material than the "Amoco 121" but does contain an appreciable amount of barium. The last of the barium-containing detergents is another commercial additive "Santolube 333," and this commercial detergent differs chemically from both the experimental barium detergent and the "Amoco 121." Upon examining the data of Tables 7–13 it will be noted that the "Amoco 121" is in general more reactive with the V.I. improvers than the other two detergent additives. A further examination of the tables indicates that both "Paratone 430" and "460" are very unstable in the presence of barium detergents whereas the V.I. improvers of the invention are sufficiently stable to be usable in lubricating oils in the presence of barium detergents. In Table 8 it will be noted that the "Paratone 460" was so unstable in the presence of "Amoco 121" that the entire oil gelled in a number of instances. In other words it can be concluded that whereas the V.I. improver additives of the invention are usable in lubricating oils in the presence of barium detergents, the "Paratone" type V.I. improvers such as "430" and "460" are not sufficiently stable to be usable in lubricating oils in the presence of barium detergents.

Some of the additives of the invention are in addition to being V.I. improvers also pour point depressants. For example, Base Oil No. 2 has a pour point of +15° F., 0.05 weight percent of the additive of Example 19 reduces this pour point to −15° F. and 0.25 weight percent of this same additive of the invention reduces the pour point of Base Oil No. 2 to −20° F.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A mineral oil composition of improved viscosity index and hydrolysis stability comprising a major amount of mineral oil, a minor amount sufficient to improve the viscosity index of said mineral oil of oil-soluble isobutylene/dialkyl fumarate polymer, said dialkyl fumarate having an average number of not more than 10 carbon atoms in said alkyl groups but at least a sufficient average number of carbon atoms to give an oil-soluble polymer and said polymer and isobutylene existing in a 1 to 1 molar ratio in said mineral oil composition, and a minor amount of a barium-containing detergent additive.

2. A composition of claim 1 wherein said fumarate is a mixture of lower and higher dialkyl fumarates.

3. A composition of claim 1 wherein at least some of the fumarate molecules have a lower and a higher alkyl group.

4. A composition of claim 1 wherein said polymer is an isobutylene/dialkyl fumarate/isopropenyl acetate polymer.

5. A composition of claim 1 wherein said polymer is an isobutylene/dialkyl fumarate/vinyloxyethanol polymer.

6. A composition of claim 1 wherein said polymer is an isobutylene/dialkyl fumarate/vinyl ethyl ether polymer.

7. A composition of claim 1 wherein said polymer is an isobutylene/dialkyl fumarate/vinyl acetate polymer.

8. A mineral oil composition of improved viscosity index and hydrolysis stability comprising a major amount of mineral oil, a minor amount sufficient to improve the viscosity index of said mineral oil of oil-soluble isobutylene/dialkyl fumarate polymer, said dialkyl fumarate having an average number of not more than 10 carbon atoms in said alkyl groups but at least a sufficient average number of carbon atoms to give an oil-soluble polymer and said polymer and isobutylene existing in a 1 to 1 molar ratio in said mineral oil compositions, and a minor amount of a basic detergent additive.

References Cited by the Examiner

UNITED STATES PATENTS

| | | | |
|---|---|---|---|
| 2,543,964 | 3/51 | Giammaria | 252—56 |
| 2,570,788 | 10/51 | Giammaria | 260—78.5 |
| 2,710,282 | 6/55 | Linsk et al. | 252—56 |
| 2,824,836 | 2/58 | Smith et al. | 252—56 X |
| 2,936,300 | 5/60 | Tutwiler et al. | 252—56 X |

DANIEL E. WYMAN, *Primary Examiner.*

JULIUS GREENWALD, ALPHONSO D. SULLIVAN, *Examiners.*